United States Patent [19]
Sullivan

[11] 3,984,748
[45] Oct. 5, 1976

[54] TURN-RATE SYSTEM FOR GYROSCOPIC DEVICES INCLUDING MEANS FOR GENERATING THE RATE SIGNALS BY ELECTRICALLY PROCESSING GYROSCOPE SHAFT ANGLE

[75] Inventor: Gerald L. Sullivan, Salem, N.H.

[73] Assignee: General Electric Company, Wilmington, Mass.

[22] Filed: Jan. 2, 1973

[21] Appl. No.: 429,953

[52] U.S. Cl. .............................. 318/648; 318/649; 318/661; 318/654; 318/616; 318/585; 244/175; 324/160
[51] Int. Cl.² .................. B64C 13/16; B64C 17/02
[58] Field of Search .......... 318/649, 648, 661, 622, 318/621, 616, 654, 633, 585, 571; 244/77; 324/160

[56] References Cited
UNITED STATES PATENTS

| | | | |
|---|---|---|---|
| 2,465,624 | 3/1949 | Agins | 318/661 |
| 2,728,882 | 12/1955 | Cohen | 318/661 X |
| 2,866,934 | 12/1958 | Whitehead | 318/649 |
| 2,927,735 | 3/1960 | Scuitto | 318/571 X |
| 3,110,865 | 11/1963 | Scuitto | 318/571 X |
| 3,167,697 | 1/1965 | Anderson | 318/654 X |
| 3,259,819 | 7/1966 | Heiser | 318/661 X |
| 3,368,127 | 2/1968 | Grancoin | 318/661 |
| 3,514,719 | 5/1970 | Rhodes | 318/654 X |
| 3,761,811 | 9/1973 | Aberle et al. | 318/654 X |

*Primary Examiner*—T. E. Lynch

[57] ABSTRACT

The instant system describes a heading and attitude reference system for an aircraft in which slaving of the directional gyro to the magnetic compass and roll erection of the vertical gyro is cut off during turns which exceed a predetermined rate. A unique feature of the system is the manner in which the turn rate cutoff rate signal is generated from the directional gyro without incorporating either rate gyros or rate generators. The turn rate cutoff signal is generated from the directional gyro heading signal by converting the heading signal electrically into a signal proportional to turn rate. In one embodiment, the heading signal from the directional gyro which is representative of the heading shaft angle ($\theta$) is converted into a plurality of signals proportional to the sine and cosine of shaft angle $\theta$. These signals are first differentiated and then vector summed to produce a signal directly proportional to the rate of shaft rotation ($d\theta/dt$) which, in turn, is proportional to the turn rate. The turn rate signal is compared to a reference signal to produce a control signal for producing slaving and roll erection cutoff if the turn rate exceeds a predetermined value.

9 Claims, 6 Drawing Figures

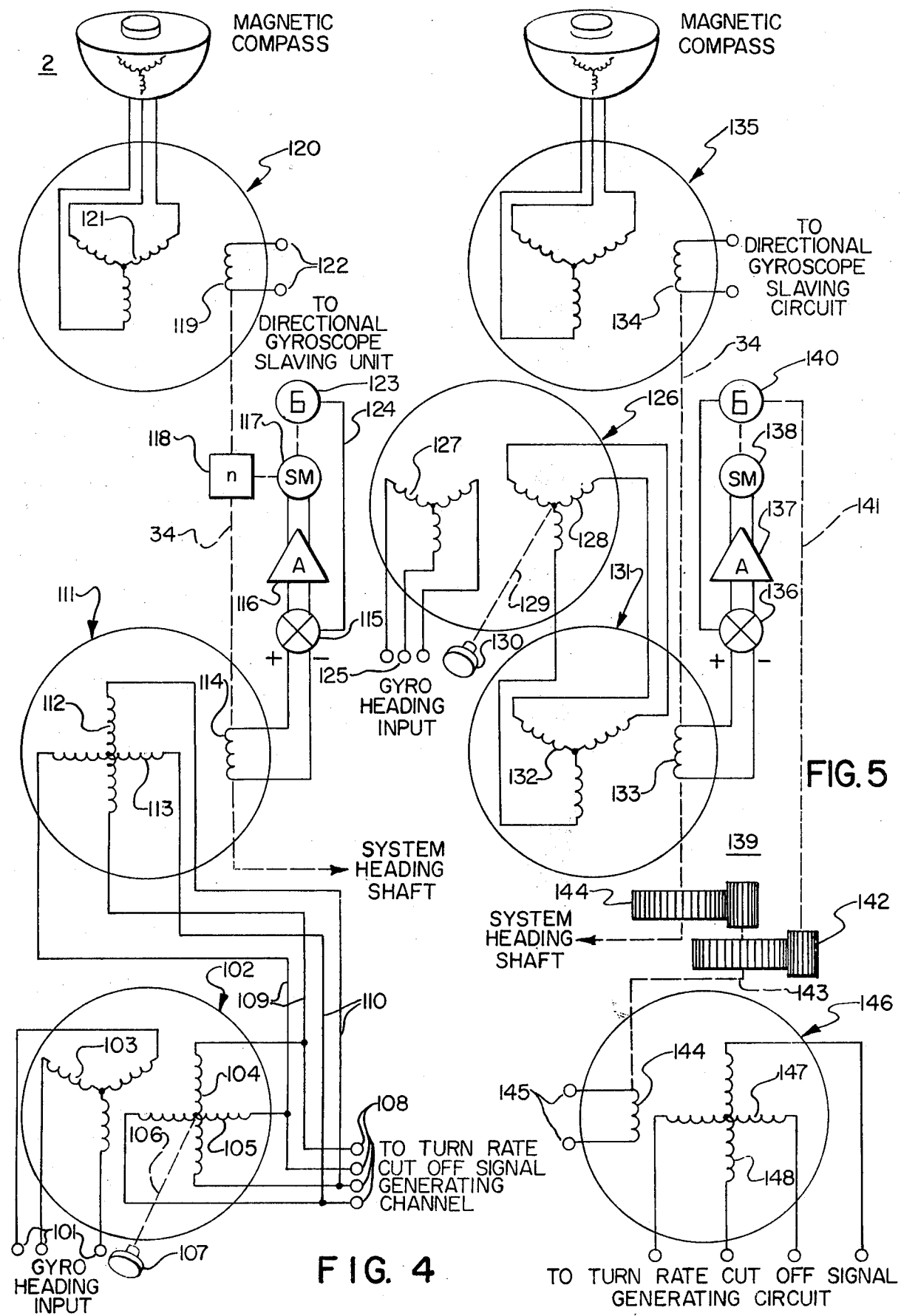

TURN-RATE SYSTEM FOR GYROSCOPIC DEVICES INCLUDING MEANS FOR GENERATING THE RATE SIGNALS BY ELECTRICALLY PROCESSING GYROSCOPE SHAFT ANGLE

This invention relates to inertial, heading and attitude reference systems which are selectively controlled during turns to avoid turn induced dynamic errors, and more particularly, to a system for electrically deriving a rate of turn signal from the inertial directional reference system to cut off slaving of the directional reference element to the magnetic compass and to cut off roll erection of the vertical gyro if the rate of turn exceeds a predetermined rate.

The heading and attitude of moveable craft such as airplanes, spacecraft and the like are customarily controlled, indicated and displayed through the use of gyroscopic sensors. Two-axis gyros are widely used to detect the heading of a craft and are commonly referred to as directional gyros while gyroscopes used to direct the attitude of the craft with respect to the longitudinal and lateral axis are commonly called vertical gyros or horizontal gyros. Both types of gyroscopes, heading and vertical, rely on the fact that a universally mounted spinning gyro rotor tends to maintain the orientation of its spin axis in space. However, because of a variety of causes, such gyroscopes tend to drift slowly away from their initial setting with time, acceleration, etc. and hence, must be corrected or slaved to a fixed reference which does not vary in this fashion. Thus, in one arrangement, it is typical to slave the directional gyro to a magnetic compass which senses the magnetic axis of the Earth. Similarly, the vertical gyro is slaved to gravity sensing pendulous devices to maintain the vertical spin axis of the gyro properly aligned.

Directional gyro systems in which the gyro is slaved to the compass, effect control of the directional gyro by applying precessional torques to the gyro to return it to the predetermined orientation in response to any departure of the gyro spin axis from this orientation. That is, if the directional gyro orientation does not correspond to the azimuth orientation indicated by the magnetic compass, an error or control signal is generated which is applied to a torque motor associated with the gyro. The torque motor then applies precessional torques about the minor axis of the gyro rotor suspension to cause movement of the rotor about the major axis until the position of the gyro spin axis is again aligned with the correct azimuth orientation as detected by the magnetic compass. Similarly, if the spin axis of the vertical gyro wanders from the true vertical, this deviation is sensed by gravity sensors, such as pendulous devices associated with the vertical gyro, to produce control or error signals which are utilized to apply precessional torques to return the spin axis to its proper orientation.

Under steady state conditions, the compass and gravity sensing pendulous devices provide accurate reference elements for correcting either the directional gyroscope or the vertical gyroscope if either of those sensing devices drift away from their proper setting. It is common knowledge, however, that both the compass and pendulous devices are sensitive to certain acceleration forces and hence, they may not provide accurate references when the vehicle upon which the system is mounted is subject to certain types of acceleration. Thus, it is well-known that during turns of an aircraft carrying such a heading and attitude system, various forces are applied to the sensing devices which often cause erroneous corrective torques or forces to be applied to the inertial devices. For example, centripetal acceleration during a turn, causes the magnetic compass sensing element to be no longer horizontal and thus, a non-horizontal component of the Earth's magnetic field is sensed. This erroneous azimuthal information will cause the directional gyro to be erroneously oriented through the action of the slaving channel between the magnetic detector and the directional gyro. Similarly, a gravity sensing device such as a roll pendulum will, during a turn acceleration, line up with the vector direction of the resultant of the gravitational and centripetal acceleration forces rather than the true vertical. The roll pendulum thus applies a roll erecting signal to the pitch axis torquer of the vertical gyro which will attempt to align the spin axis of the vertical gyro with the roll pendulum thus introducing a vertical error since this tends to align the spin axis not with the gravitational vector but with the acceleration influenced apparent vertical. Thus, it can be seen that during turns, both the directional gyro and the attitude sensing vertical gyro are subject to erroneous operation because the reference elements, such as the magnetic compass and the pendulous gravity sensor are subject to errors introduced by turn acceleration.

It has been well-known in the past to provide some arrangement for interrupting the slaving of the directional gyro and the erection of the attitude sensing vertical gyro during turns which exceed a certain predetermined rate to prevent introduction of these unwanted errors. Basically, the arrangement for avoiding errors due to excessive turn rates, involves the interruption or cutoff of slaving and roll erection by interrupting the circuit between the sensing and control signal generating means and the force or torque applying apparatus associated with the gyroscope. At one time in the past, this was achieved by manual means in that the slaving and/or roll erection channels are rendered ineffective simply by operating a turn control knob or switch which disconnects the input to the torque motors associated with the gyroscopes. The pilot upon initiating a turn simply actuated the turn control knob thereby initiating cutoff of directional gyro slaving and vertical gyro roll erection. Typical of such an approach is the arrangement shown and described in U.S. Pat. No. 2,998,727 issued Sept. 5, 1961 which shows such an arrangement in FIG. 1 thereof and describes this manual approach in Columns 5, lines 70–75 and Column 6, lines 1–5.

Obviously, such a manual cutoff arrangement is primitive in the extreme and suffers various shortcomings which make more sophisticated automatic cutoff approaches imperative. One prior art approach for automatically cutting off slaving and roll erection employs a separate rate gyroscope which is gimbaled for one degree of rotational freedom at right angles to its spin axis and is constrained by springs towards a normal position. Turning of the vehicle on which the rate gyro is suspended causes the main gimbal to tilt against the force of the springs, and if the rate of turn exceeds a predetermined magnitude, electrical contacts associated with the gimbals are caused to open, deenergizing the torque motors and halting application of corrective forces, thereby automatically cutting off slaving or roll erection as the turn rate exceeds a predetermined rate. Alternatively, rate gyros could be used to actuate relays or other switching devices to interrupt or cut off slaving or roll erection rather than utilizing directly actuated mechanical electrical contacts. However, in either event, rate gyros, even in their simplest form, add considerably to the cost and weight of a heading and attitude reference system since obviously, another inertial device has been added to the overall system. Hence, a need was felt for an automatic cutoff system during turns which avoided the use of rate gyros because of the weight, complexity, and cost that added to the system.

One such improved automatic cutoff system which avoided the use of a rate gyroscope is described in U.S. Pat. No. 2,866,934 and issued Sept. 30, 1958 in the name of Harold S. Whitehead, entitled, "Directional System Sensitive to Rates of Turn," assigned to the General Electric Co., the assignee of the present invention. In the above identified Whitehead patent, the servo driven output shaft from the slaved directional gyro is utilized to drive a signal generator such as a tachometer generator to generate a signal proportional to the rate of turn. As described in the Whitehead patent, the output shaft of the servo system rotates at a speed proportional to the instantaneous rate of turn of the craft upon which the directional gyroscope was mounted. The rotation of this output shaft is used to govern the output of an electrical signal generator to produce a signal proportional to the rate of turn. This rate of turn signal is then utilized to actuate the cutoff device whenever the output from the rate generator exceeds a predetermined amplitude indicating that the rate of turn of the craft has exceeded a given rate. However, since the rate at which the output shaft and the directional gyro shaft rotate during a turn is fairly low, for example, it is often desired to cut off slaving and roll erection when the turn rate is between 3° per minute and 6° per minute, it is obvious that the shaft rotation rate is very low. For example, at 3° per minute, the shaft turns through one complete revolution every 120 minutes or once every 2 hours. Consequently, in order to produce a useable output signal from the rate generator, it is necessary to use a high speed servo motor driving the tachometer generator and a gear reducer with a high gear reduction ratio to gear the output heading shaft down to the actual rate of rotation. Thus, while the systems of the type described in the above identified Whitehead patent are useful and effective in many situations where turn rate cutoff is required, and is able to perform this function effectively without the use of rate gyros and the like, the necessity for a high gear ratio between the motor driving the rate generator and the output shaft can in some circumstances, introduce difficulties.

With the advent of very high performance aircraft, high rotational speed turns are not uncommon and place stringent demands on the follow-up servo system since it must typically track turns at slewing rates as high as 300°/sec. That is, though slaving and roll erection cut-out may take place as low as 3°/minute, the system heading shaft and the servo system driving it must follow turn rates as high as 300°/sec., a ratio of 6000 to 1. The maximum speeds of commercially available servo motors and the high slewing rates required for the servo system limit the gear ratios to relatively low values of no more than 100 to 150 to 1. As a result, the rotational speeds at which the tachometer generator is driven at the desired cutoff rate of 3°/minute is so low that the output of the tachometer generator becomes marginal for cutoff purposes. For example, the maximum speed of commercially available servo motors of the size and weight applicable to heading attitude and reference systems is roughly 7500 RPM. At the maximum slewing rate for the servo system (i.e., 300°/sec. for example) the heading shaft must be driven at a speed of 50 RPM (i.e., at 300°/sec. the rotation speed in RPM is $$\frac{300°/sec.}{360°} = 5/6 \text{ RPS} \times 60 - 50 \text{ RPM}).$$

With a maximum servo motor speed of 7500 PRM the maximum permissible gear ratio to drive the heading shaft at 50 RPM for a slew rate of 300°/sec. is $$(\frac{7500 \text{ RPM}}{50 \text{ RPM}} = 150).$$

If a greater gear ratio is used the system will not track at the maximum turn rates of 300°/sec. and an error will be present in the system heading output shaft.

With the gear ratio limited to 150, the servo motor speed at a turn rate of 3°/min. is only 450°/min. Consequently, the rate generator is driven at a rate of 1¼ RPM and at this speed, the output from the rate generator is marginal for cutoff purposes.

Therefore, there is a need for a system in which the turn rate cutoff signal is derived from gyro heading information and which does not include electromechanical devices such as rate generators. Applicant has found a means of deriving such a turn rate signal by processing a heading signal which is proportional to the gyro output shaft angle.

It is therefore a primary objective of the instant invention to provide an inertial heading attitude and reference system which has means for interrupting slaving and erecting torque during turns exceeding a predetermined rate without utilizing rate gyros or rate signal generators.

Another objective of this invention is to provide heading attitude and reference system in which slaving and/or erection is cut off in response to turn-rate signal generated by processing a heading signal representative of the shaft angle of one of the inertial devices to produce a signal proportional to the rate of shaft of rotation and hence, the turn rate.

Still another objective of the invention is to provide a turn rate cutoff system in which the turn rate signal is generated electronically from the output shaft angle of the inertial device without the utilization of turn responsive signal generating means.

Other objectives and advantages of the invention will become apparent as the description thereof proceeds.

Briefly, in accordance with one aspect of the invention, turn rate cutoff for interrupting slaving of the directional gyro and roll erection of the vertical gyro is effectuated in response to a turn rate signal which is generated indirectly from shaft angle (i.e., heading) information to produce a signal proportional to the rate at which the directional gyroscope output shaft rotates during turns. The shaft angle information from the directional gyro is processed in a turn rate cutoff signal generating channel in which the shaft angle signal is converted into signals proportional to the sine and cosine of the shaft angle. These signals proportional to the sine and cosine of the shaft angle are then differentiated to provide a signal proportional to the rate of change of the sine and cosine of shaft angle. The two differentiated signals are then vectorially summed to produce a single output rate signal which is proportional to the rate at which the shaft is rotating and hence, the rate of turn of the vehicle. This rate signal is then compared to a reference signal to produce a control or error signal whenever the turn rate exceeds a predetermined level. The error signal actuates circuitry which cuts off or interrupts slaving of the directional gyro to the magnetic compass and interrupts roll erection of the vertical gyro.

The novel features, which are believed to be characteristic of this invention, are set forth with particularity in the appended claims. The invention itself however, both as to its organization and mode of operation, together with further objectives and advantages, may best be understood by reference to the following description taken in connection with the accompanying drawings in which:

FIG. 4 is a schematic illustration of an alternative emdobiment of the system for producing the signals which are representative of the sine and cosine of the shaft angle for processing in the cutoff signal generator channel.

FIG. 5 is yet another alternative embodiment of a system for producing a signal proportional to the sine and cosine of the shaft angle.

Figure 1:
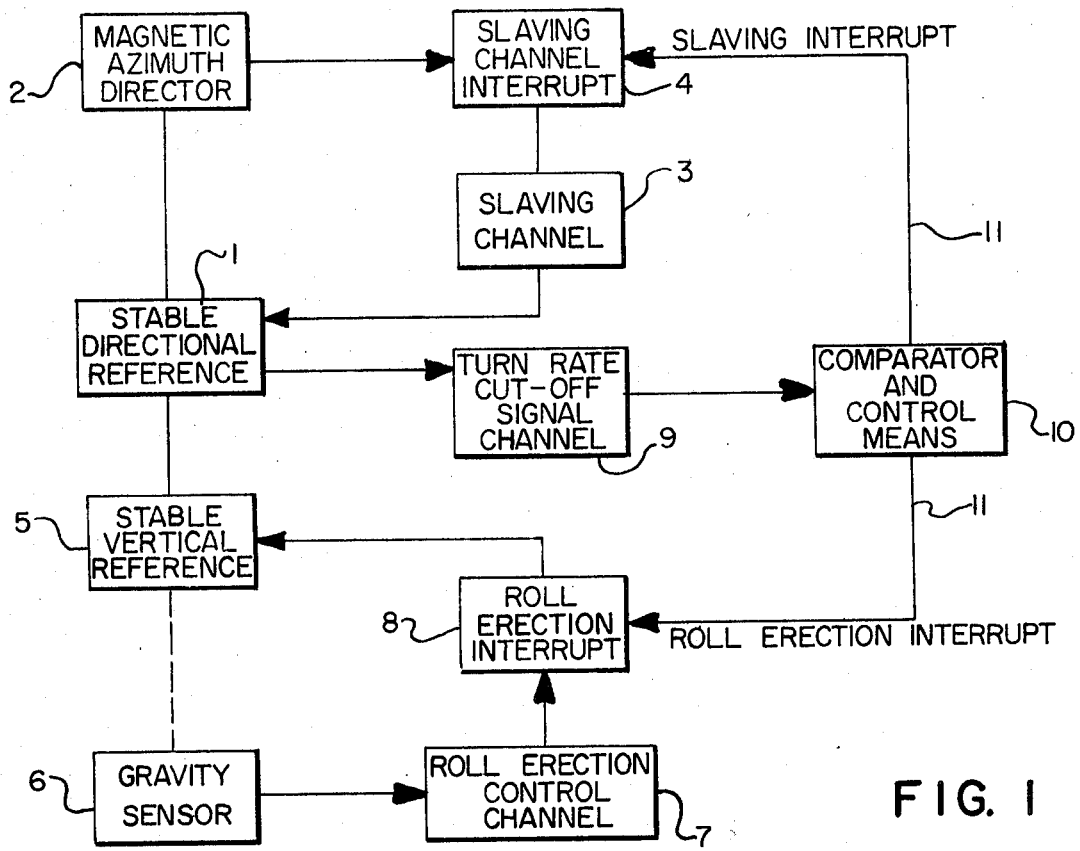
FIG. 1 is a block diagram representation of the instant invention showing the relationship between the magnetic compass, the slaved directional gyro, the vertical gyro, and the cutoff signal generating channels.

The heading and attitude system as shown in block diagram in FIG. 1 includes a stable directional element 1 in the form of a directional gyroscope; a magnetic azimuth detector 2 such as a magnetic compass which is coupled to the directional gyroscope by a slaving channel 3 and a slaving channel interrupt circuit 4. As will be pointed out in detail later, slaving channel 3 consists of a servo system in which the output of the stable directional device is continuously compared to the output from the magnetic compass to drive the directional gyro into correspondence with the alignment of the compass. Also forming part of the system is a stable vertical reference 5 which may be a vertical gyro which has a pendulous gravity sensor 6 mounted thereon. Gravity sensor 6 is coupled to the stable vertical reference through a roll erection control channel and a roll erection interrupt channel 8. Gravity sensor 6 is typically mounted along the roll axis of the vertical gyro so as to indicate any displacement between the gravity vector and the spin axis of the vertical gyro about the roll axis. Any deviation between these vector directions produces a control signal which is applied to a torquer associated with the inner gimbal of the vertical gyro to precess the vertical gyro and bring it into alignment with the gravity sensing pendulous device 6.

Slaving and roll erection interrupt channels 4 and 8 are controlled by a turn rate cutoff signal generating channel 9 and the comparator and control network 10. Turn rate cutoff signal generating channel 9 takes heading information from directional gyroscope 9 in the form of a shaft angle $\theta$ and through processing of the shaft angle signal produces an angular rate signal which is an indication of the turn rate of the vehicle. This angular rate signal is compared to a reference signal in comparator 10 to produce a control signal whenever the angular rate signal exceeds a predetermined level indicating that a predetermined rate of turn has been exceeded. The control signal actuates slaving and roll erection cutoff and is, to this end, applied over leads 11 and 12 to the channels 4 and 7 to cut off slaving and roll erection whenever the turn rate exceeds a predetermined level which introduces unacceptable errors into the directional and vertical gyro elements. Turn rate cutoff signal generating channel 9 produces angular rate signals without the need for tachometer devices or rate gyros by processing heading information signals and converting them through to a rate signal. The manner in which heading information in the form of a shaft angle may be converted into a signal proportional to the angular rate without the use of tachometers and/or rate gyros may be seen from the following mathematical considerations. During a turn, the output shaft for the heading and attitude reference system as well as the output shaft of the directional gyro repeats the relative orientation between the craft and the directional gyroscope. If shaft position signals can be derived by means of a potentiometer or a resolver, etc., (i.e., signals which are proportional to the sine and cosine of the shaft angle), these signals will vary instantaneously as the shaft rotates during turns. By processing these signals in the manner to be described presently, an output signal can be derived which is proportional to the rate of change of the shaft angle and hence, the rate of the turn. thus, assume that two signals, which are proportional to the sine and cosine of the output or gyro shaft angle are produced in any suitable manner so that:

$$E_1 = E_M \sin \theta \tag{1}$$

and $$E_2 = E_M \cos \theta \tag{2}$$

where $E_M$ is the maximum output signal and $\theta$ is the shaft angle. These signals may then be converted to rate signals $R_1$ and $R_2$ by differentiating the shaft angle (i.e., heading information) as follows:

$$R_1 = \frac{dE_1}{dt} = + E_M \cos \theta \; \frac{d\theta}{dt} \tag{3}$$

$$R_2 = \frac{dE_2}{dt} = - E_M \sin \theta \; \frac{d\theta}{dt} \tag{4}$$

If these two rate signals $R_1$ and $R_2$ are vector summed, the resultant is a total rate signal R:

$$R = \sqrt{R_1^2 + R_2^2} = \left[ \left(E_M \cos \theta \; \frac{d\theta}{dt}\right)^2 + \left(-E_M \sin \theta \; \frac{d\theta}{dt}\right)^2 \right]^{1/2} \tag{5}$$

$$R = \left[ E_M^2 \left( \frac{d\theta}{dt} \right)^2 \cos^2\theta + \sin^2\theta \right]^{1/2} \qquad (6)$$

Since,
$$\cos^2\theta + \sin^2\theta = 1, \qquad (7)$$

Equation 5 for the total rate signal R simplifies to:

$$R = E_M \frac{d\theta}{dt} \qquad (8)$$

which clearly shows that the total rate signal derived from the heading information $\theta$ is directly porportional to the rate of shaft rotation and hence, to the rate of turn of the vehicle upon which the directional gyro is mounted. It will also be obvious from the above that since the rate signal is produced by taking signals representing shaft angle from the directional gyro and processing the signal by differentiation and vector summation, that the signal processing may be done completely electronically without the use of electromechanical devices such as rate generators or inertial devices such as rate gyro thereby simplifying the system and increasing its accuracy.

Figure 2:
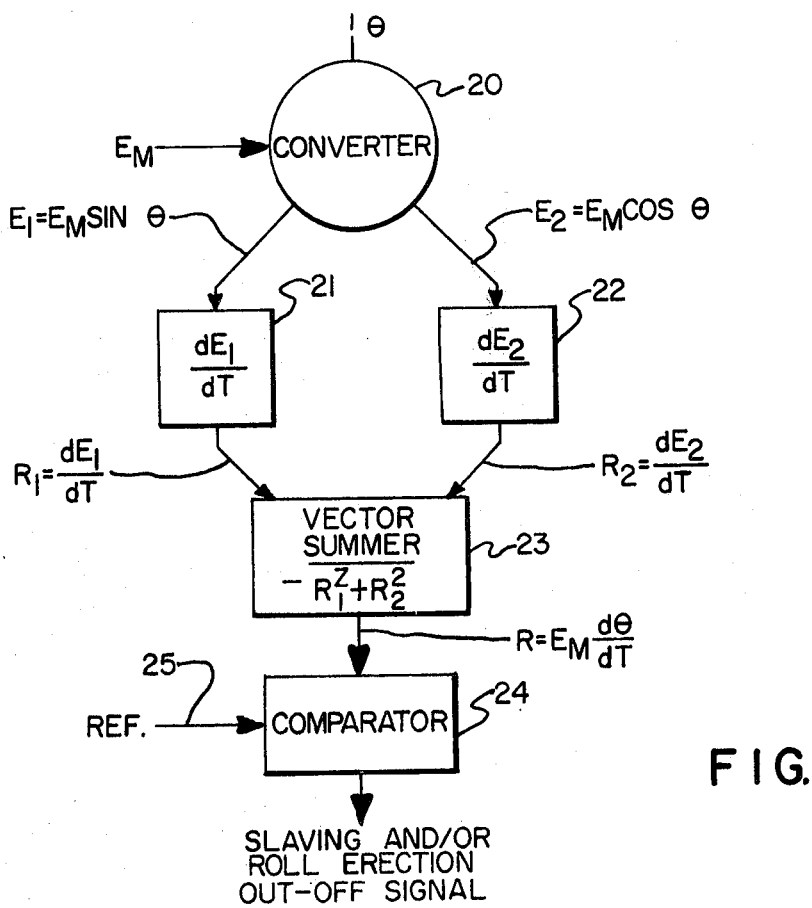
FIG. 2 is a block diagram of the cutoff signal generating channel showing the logic sequence of signal processing to produce a rate signal proportional to the rate of turn of the aircraft from heading information in the form of a shaft angle $\theta$.

FIG. 2 illustrates, in schematic form a signal processing network for mechanizing the equation for obtaining a shaft rotation rate signal from shaft angle information. Shaft angle information $\theta$ is applied (either directly or as a polyphase synchro signal) to a converter 20 along with a reference signal $E_M$.

The output from converter 20 is two signals proportional respectively to a sine and cosine of the shaft angle. $\theta$. The converter may be one of a variety of devices for performing this function. One such device is the resolver which is an electromechanicl induction device having a stator and rotor assembly each including two winding connected in quadrature. One rotor winding is energized from an input signal so that the two output windings deliver output signals proportional to the input signal multiplied by the sine and cosine, respectively, of the angle between the stator and rotor at any instant. Alternatively, the converter may consist of a Scott-Tee transformer connection which receives a three-phase synchro input signal and converts that signal to a two-phase signal having the desired sine and cosine relationship. Yet another embodiment of the converter may be a simple potentiometer in which the wiper is driven by the shaft to produce an output which is a sine and cosine function of the shaft angle.

The two signals $E_1$ and $E_2$ from converter 20 are differentiated in the differentiating networks 21 and 22 to produce the rate signals $R_1$ and $R_2$. The output of the differentiating networks are respectively:

$$R_1 = + E_M \cos\theta \frac{d\theta}{dt} \text{ and}$$

$$R_2 = - E_m \sin\theta \frac{d\theta}{dt}$$

It is to be noted that if the input signals to the differentiating networks are from a resolver, polyphase synchro or a Scott-Tee network, the input signals are amplitude modulated signals which have to be demodulated to remove the carrier before differentiation so that the input to each differentiating network is a varying unidirectional voltage which varies as a function of the sine and cosine of the shaft angle. Of, on the other hand, the converter is simply a DC voltage excited sine-cosine potentiometer, driven directly by the shaft, no demodulation is necessary before application of the signal to the differentiating network.

Rate signals $R_1$ and $R_2$ are applied to a vector summer 23 to produce an output signal which is proportional to the total rate signal R. Vector summer 23 produces a signal which is equal to the square root of the sum of the square of two input signals so that the output from vector summer 23 as shown by Equation (8) is proportional to the rate of shaft rotation $d\theta/dt$, $$R = E_M \frac{d\theta}{dt}. \qquad (8)$$

Devices which perform vector summation are well-known and there are a variety available commercially. Some are electromechanical systems using resolver chains and others are logic circuits which compute the square root of the sum of two or three squares. An example of the electromechanical resolver chain type is shown and described in FIGS. 172 and 176 (pp 61–63) of the Publication *Technical Information for the Engineer, No. 1, — Motors, Motor Generators, Synchros, Resolvers, Electronics, Servos,* 10th Edition, published by Kearfott Products Division-General Precision Systems Inc., Little Falls, N.J. — 2/15/58 revised 5/30/67.

An example of the vector computation module using all solid state circuitry to perform the vector summing function is a modular unit manufactured and sold by Intronics, Inc. of 57 Chapel St., Newton, Mass. under their designation *Vector Operator Model VM*101. Reference is hereby made to the Intronics publications 12/702M which describes the characteristics and function of solid state vector summing modules capable of producing the vector sum of two or three variables. Vector summing modules of the type described in the Intronics publication are well-known and are referred to here as typical of the electronic vector summing devices available commercially today.

The rate signal R which varies as a function of the rate of shaft angle rotation and, hence, is proportional to the turn rate of the vehicle on which the system is mounted, is applied as one input to a comparator 24 where the magnitude of the rate signal is compared with a reference signal 25 to produce an output from the comparator whenever the rate signal exceeds a predetermined level. Thus, for example, in many high performance aircraft today, the requirement is that directional gyro slaving and roll erection of the vertical gyro be cut off whenever the turn rate exceeds a range of ±3° per minute. That is, if the turn rate is less than 3° per minute, the error introduced to the directional and vertical gyros due to the turn of the aircraft is acceptable and slaving and roll erection should not be interrupted. However, if the turn rate exceeds 3° per minute, then the error becomes unacceptable and cutoff of slaving and roll erection is to be initiated. Hence, the reference is set at the desired level to produce an error or control signal from the comparator to interrupt slaving and roll erection of the vertical gyro whenever the turn rate of the vehicle as represented by the rate signal from vector summer 23 exceeds 3°.

Figure 3:
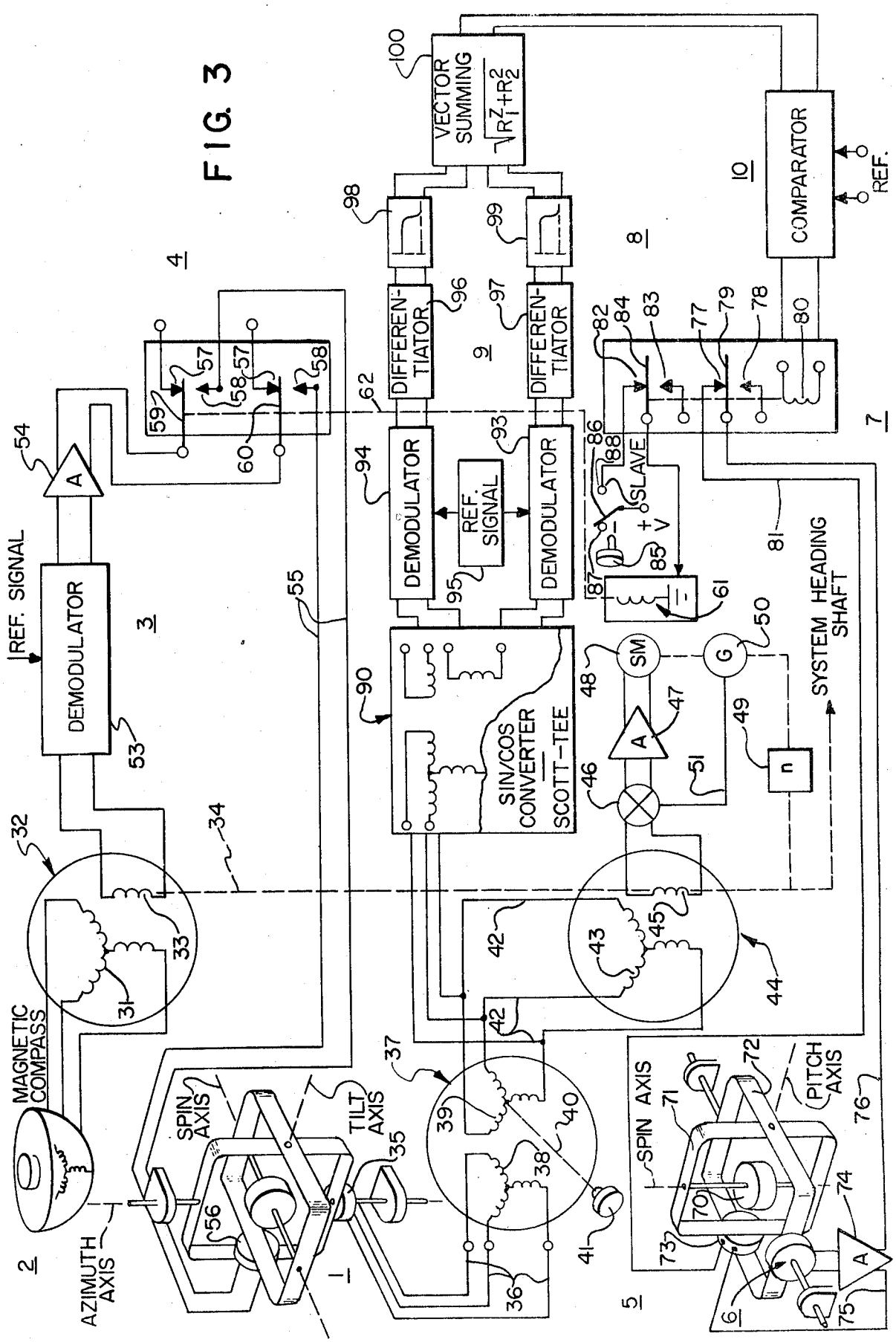
FIG. 3 illustrates partially in schematic and partially in perspective form a preferred embodiment of the invention utilizing a turn rate cutoff system.

FIG. 3 shows a heading, attitude reference system embodying a turn rate cutoff system in which the turn rate cutoff signal is derived by processing heading information (in the form of a shaft angle $\theta$) from the directional gyro to produce a signal proportional to the rate of shaft rotation and the rate of turn of the craft. The heading, attitude and reference (HAR) system includes a magnetic compass 2 which can typically take the form of a flux gate valve that governs, through the slaving channel presently to be described, the azimuthal orientation of a directional gyroscope 1. Also included is a vertical gyro 5 having a gravity sensing pendulous device 6 rigidly affixed to one of its gimbals. The gravity sensing pendulous device, which may be of any one of a variety of devices for this purpose, controls roll erection of the vertical gyro. Magnetic compass 2 is coupled to the directional gyro by means of a slaving channel shown generally at 3 and a slaving interrupt network 4 which, as will be described presently, takes the form of a multi-element relay. The pendulous gravity sensing element 6 is coupled to vertical gyro 5 by means of a roll erection channel shown generally at 7 and roll erection interrupt network 8, which is also in the form of a multi-contact relay. Slaving of the directional gyro to the magnetic compass and roll erection of the vertical gyro is interrupted if the output signal from turn rate cutoff signal generating channel 9 which is coupled to directional gyro 1 exceeds a predetermined amplitude. Channel 9 generates a turn rate signal from gyro hearing information by differentiating and vector summing signals which vary as the directional gyro changes its orientation during turns. As the system heading output shaft and the directional gyro rotate during turns, the changes in shaft angles are processed in turn rate cutoff signal generating channel 9 to convert trigonometric functions of the shaft angle $\theta$ by differentiation and vector summing to produce rate signal representative of the rate of turn of the shaft and hence, of the directional gyro. This signal which is generated from the shaft angle is compared with a reference signal in comparator 10 to produce a control signal from the comparator whenever the turn rate exceeds the predetermined value. The control signal actuates the roll erection and slaving channel interrupt networks 4 and 7 to cut off slaving and roll erection during turns which exceed a predetermined rate.

Directional Gyro Slaving

The slaving channel 3 and its associated servo system governs the alignment of directional gyro 1 in azimuth so that any long term deviation of the directional gyro spin axis from the desired azimuth is continually corrected so that it is in alignment with the magnetic compass. Associated with the magnetic compass is a compass transmitter, not shown, of well-known construction which produces a second harmonic pattern of signals in response to the strength and direction of the horizontal component of the Earth's field. This signal is repeated across polyphase stator windings 31 of control transformer 32. A mechanically positioned rotor winding 33 mounted on shaft 34 has a phase and amplitude modulated control signal induced therein whenever the angular orientation of the rotor winding departs from the orientation of the magnetic compass. Thus, if a difference between the azimuthal orientation of the directional gyro and the magnetic compass occurs due to slow drift of the gyro spin axis which causes shaft 34 and rotor winding 33 to shift angularly, a voltage will be induced in rotor winding 33 which is a function of the sine of the angular displacement between the two. However, as long as rotor winding 33 is rotated during turns or otherwise maintains its position relative to the shifting field, no control signal is induced in the winding.

Rotor winding 33 tracks movement of directional gyro 1 by virtue of a servoloop, presently to be described, and the control signal from the magnetic compass 2 is coupled to slaving channel 3 to slave directional gyroscope 1 to the azimuth of the magnetic compass. Directional gyroscope 1 is provided with a position transmitter synchro 35 (also sometimes referred to as a control transmitter) mounted on the outer gimbal. Transmitter 35 includes stator and rotor windings, not shown, with the rotor winding excited from an alternating current source and arranged to rotate in azimuth with the gyro rotor shaft about its output axis. The stator winding from the position synchro transmits a three-phase heading signal over leads 36 to a control differential transmitter 37. Control differential transmitter 37 includes polyphase stator 38 coupled to position transmitter 35 of the directional gyro and a polyphase rotor 39 mounted on shaft 40 which is controlled externally by a setting knob 41 to position the rotor.

Rotor 39 is initially positioned either by setting shaft 40 manually as shown or by a servoloop to align the directional gyro heading signal rapidly with the desired heading. The output from control differential transmitter 37 is an electrical angle from rotor 39 equal to the mechanical angular position of rotor 39 relative to stator 38 added to the electrical angle of the input signal applied to polyphase stator winding 38 representing the actual orientation of the spin axis of the directional gyro rotor. The signal from rotor 39 is then utilized to control the servoloop which positions output shaft 34 and rotor winding 33 of compass control transformer 32.

One output from rotor winding 39 of differential transmitter 37 is applied over leads 42 to polyphase stator winding 43 of a repeater control transformer 44. Repeater control transformer 44 has a rotor 45 mounted on output shaft 34 and the signal induced in rotor winding 45 represents any angular difference between the directional gyro position and the angular position of shaft 34. The signal induced in rotor winding 45 controls a servoloop which drives shaft 34 to track the directional gyro orientation. The servoloop includes summing node 46 coupled to the input of a servo amplifier 47. Thus, a signal induced in rotor winding 45 which represents any departure of the directional gyro from the desired azimuth orientation is amplified in servo amplifier 47 and controls a reversible servo motor 48 which drives shaft 34 and rotor windings, 45 and 33 through a reduction gearing 49 into positional correspondence with the gyro. Servo motor 46 also drives a generator 50 to generate a negative feedback signal which is applied over a lead 51 to summing node 46.

When movement of directional gyro due to drift etc. repositions shaft 34 through the servoloop, the angular position of rotor winding 33 of magnetic compass control transformer 32 no longer corresponds to the orientation of the magnetic compass. A signal is induced in rotor winding 33 which is proportional to the difference in angular orientation between the rotor and magnetic compass. This signal from winding 33 is an amplitude modulated, single side band, carrier suppressed signal which is demodulated in a demodulator 53. Demodulator 53, which may, for example, be a synchronous demodulator has a carrier reinsertion reference signal applied thereto to produce a demodulated output which is a DC signal that varies with the sine of the angular position difference. The demodulated signal is amplified in an amplifier 54 and is applied through slaving interrupt relay network 4 and leads 55 to a torque motor 56 positioned on the inner gimbal of the directional gyro. Torque motor 56 applies a torque to the inner gimbal which causes precessional movement of the gyro in the proper direction to return the gyroscope to its predetermined orientation so that the output of rotor winding 39 of differential 37 concides with the orientation of the magnetic compass. This, in turn, drives shaft 34 through the servoloop to null the rotor windings.

Slaving interrupt network 4 includes a pair of normally closed contacts 57, a pair of normally open contacts 58 connected to torque motor leads 55, and a pair of moveable relay armatures 59 and 60 connected to the output of amplifier 54. Operation of the relay is controlled through a normally energized relay winding 61 and a shaft 62 to connect the output of amplifier 54 to torque motor 56 during normal slaving operation and to disconnect the amplifier from the torque motor whenever the turn rate as determined by comparator 10 and the turn rate cutoff signal channel 9 exceeds a predetermined value. When relay 61 is energized, armatures 59 and 60 are positioned against normally open contacts 58 thereby connecting the output of amplifier 54 to leads 55 and to torque motor 56 associated with the inner gimbal of the directional gyro. When relay winding 61 is deenergized as is the cae during turn rate cutoff, armatures 59 and 60 are positioned against normally closed contacts 57 and slaving is interrupted.

Relay winding 61 is selectively controlled by comparator 10 through part of relay switching element 8 so that relay winding 61 is energized during normal operation. Whenever the turn rate exceeds a predetermined value, the output from comparator 10, actuates relay switching circuit 8 to deenergize relay winding 61. When relay winding 61 is deenergized, armatures 59 and 60 move against the normally closed contacts 57 thereby disconnecting leads 55 from the output of amplifier 54 thereby interrupting slaving of the directional gyro to the magnetic compass.

The servo driven output shaft 34 in addition to positioning rotors 33 and 45 provides the system heading output and may be used directly to actuate a pointer of a direction indicating mechanism. In the usual case, however, the shaft may be provided with one or more control or synchro transmitters, now shown, to transmit direction to a remote location or to perform some desired function associated with the heading such as radar stabilization, directional indication in some sort of presentation system or, for that matter, auto pilot operation.

In summary, under normal slaving conditions, if the position of the directional gyro as represented by shaft 34 coincides with the magnetic compass orientation, no signal is induced in winding 33. Any movement of the directional gyro away from alignment with the compass drives shaft 34 through the servoloop so that rotor winding 33 is no longer aligned with the electrical angle of the signal from the compass and a signal is induced in rotor winding 33. The signal from rotor winding 33 is demodulated, amplified and applied via leads 55 to the torque motor 56 mounted on the inner gimbal of the directional gyro to apply a torque to the inner gimbal which causes the directional gyro rotor to precess until it aligns itself in azimuth with the magnetic compass. This slaving of the directional gyro to the magnetic compass continues as long as the slaving interrupt network is not actuated. When the craft goes into a turn and the turn rate exceeds the preset value, a control signal from turn rate cutoff signal generating channel 9 actuates the slaving interrupt circuit 4 to terminate slaving of the directional gyro by interrupting the output control signals from the magnetic compass to torque motor 56 so that the directional gyro operates in the free gyro mode and is no longer slaved to the compass.

Vertical Gyro Erection

Vertical gyro 5 comprises a spinning rotor element 70 mounted in an inner gimbal 41 which has a single degree of freedom about the pitch axis and an outer gimbal 42 which has a single degree of freedom about the roll axis. A torque motor 73 is mounted on the inner gimbal to apply precessing torques which cause the gyro rotor to precess and maintain it aligned properly. Mounted on the outer gimbal is a gravity sensing element shown generally at 6 which is aligned with the Earth's vertical and is utilized to correct any roll axis misalignment between the spin axis of the gyro and the Earth's vertical. Misalignment between the gyro spin axis and the Earth's vertical may be due to drift of the gyro, random torques that may be exerted about the gimbals, and the Earth's rotation. The pendulous device 6 which lines up with the Earth's vertical will thus produce an electrical signal whenever the spin axis of the gyro departs from the Earth's vertical. Pendulous device 6 is mounted on the roll axis and therefore, senses movement about the roll axis to produce an electrical output signal responsive to any departure of the spin axis from the vertical. This signal is utilized to control torque motor 73 which applies torque in the proper direction to cause the gyro to precess and return the spin axis to the proper vertical alignment.

Pendulous device 6 may be any one of a number of available gravity sensing devices. It is, however, preferably of the type which is extremely light weight so that it does not apply any torques to the outer gimbal. Typically, one of the pendulous devices which may be utilized is the well-known electrolytic pendulous reference element which depends on the electrical resistance of a fluid. A low resistance fluid which permits current flow is positioned inside of a casing so that at the null position the electrolyte covers equal area of a pair of contacts also found within the casing. Consequently, the resistance through these contacts to the opposite case face is equal. However, as the case tilts due to a departure of the spin axis from the true vertical, the position of the fluid shifts so that one contact area increases, thereby decreasing resistance through the contact to the case, while the other contact area decreases, thereby increasing the resistance. Hence, an electrical signal is produced which is responsive to this deviation and proportional to the degree of angular departure of the gyro spin axis from the true vertical.

This output signal is applied to an amplifier 74 and coupled over lead 75 to one input of torque motor 73 and by lead 76 and the roll erection interrupt network 8 to the other input of torque motor 73.

Roll erection interrupt network 8 comprises a normally clossed contact 77, a normally open contact 78, a relay armature 79 connected to lead 76 and a relay winding 80. Relay winding 80 is controlled from the output of comparator 10 and is energized only when the output from comparator 10 indicates that the turn rate exceeds the predetermined level and that both roll erection and slaving is to be interrupted. Thus, relay winding 80 is normally deenergized and armature 79 which is connected to lead 76 and the output of amplifier 74 is positioned against the normally closed contact 77 which is connected through lead 81 to the torque motor. Thus, under normal conditions, the output from the gravity sensing pendulous device 6 is amplified and applied to the torque motor 73 to torque the inner gimbal and precess the gyro in the proper direction to align the spin axis of the gyro with the Earth's vertical.

Whenever the craft goes into a turn and the turn rate exceeds a predetermined value, the output from comparator 10 energizes relay winding 80 and armature 79 is moved from contact 77 to normally open contact 78, interrupting the application of control signal to torque motor 73 and terminating roll erection.

Also associated with the roll erection interrupt relay is another set of relay contact which control slaving interrupt relay winding 61. Thus, relay winding 80 also controls an armature 84 which is positioned against normally closed contact 82 when relay 80 is deenergized and against normally open contact 83 when the relay is energized. Contact 82 is connected to a manually actuated mode selection switch 85 which applies energizing voltage to slaving interrupt relay winding 61 when the slaving mode is chosen for the directional gyro. Mode selection switch 85 includes a manually actuated armature 86 which is connected to a source of energizing voltage +V. Armature 86 may be selectively positioned against a first contact 87 when the system is in the free gyro mode or against contact 88 when the system is in the slaving mode. Contact 88 is connected to relay contact 82, which is in turn, connected to slaving relay 61 through relay armature 84. Thus, with the system in the slaving mode, mode selecting switch 85 positions armature 85 against contact 88 which applies a positive DC voltage to slaving relay winding 61 through contact 82 and relay, armature 84. Slaving relay winding 61 is thus energized so that the slaving channel is connected through slaving interrupt network to directional gyro torque motor 56. When the system is in the free mode, mode selection switch 85 positions armature 86 against contact 87 removing the positive voltage and deenergizing slaving relay winding 61. Slaving interrupt network 4 is actuated and the slaving channel is disconnected from gyro torque motor 56.

In normal operation, with the slaving mode selected, slaving relay 61 is energized through contact 82 and armature 84 as long as roll erection interrupt relay 80 is deenergized. Whenever relay 80 is energized by the control signal from comparator 10, armature 84 moves away from contact 82 thereby terminating application of the positive voltage to slaving channel relay winding 61. When winding 61 is deenergized, armatures 59 and 60 in slaving channel interrupt network are moved against the normally open contacts 57 terminating application of the slaving signal to the directional gyro torque motor 56, and permitting the directional gyro to operate in the free gyro mode.

Turn Rate Cutoff Signal Channel

Turn rate cutoff signal generating channel 9 is coupled to the directional gyro through the position pickoff 35 and control differential transformer 37 to produce a control signal which disables slaving and roll erection channels whenever the turn rate of the aircraft carrying the heading and attitude reference systems exceeds a predetermined value such as 3° per minute. Channel 9 processes heading information in the form of a signal proportional to the angular position of the directional gyro output shaft and converts this angular position signal into suitable trigonometric functions of the shaft angle. These signals are then differentiated and vector summed to produce a signal proportional to the rate of shaft rotation and hence turn rate.

As pointed out previously, the measured directional gyro position transmitter shaft angle constantly follows the relative orientation between the craft and the directional gyroscope, as the craft direction changes, since the gyro case rotates with the turn of the craft upon which the gyroscope is mounted. The changing angular position of the case with respect to the shaft at any point in time may be utilized to derive a rate signal proportional to the rate at which the case is turning and hence, the rate at which the vehicle is turning. Thus, the output from rotor winding 39 of control differential transformer 37 consists of three phase displaced signals proportional to the directional gyro shaft angle $\theta$ plus a fixed difference angle entered by rotor shaft 40 and is in effect, proportional to shaft angle $\theta$. This angular signal is converted in a Sin/Cos converter 90 to two signals proportional respectively to the sine and cosine of the heading angle. Converter 90 may be a Scott-Tee transformer connected to output winding 39 of control differential transformer 37. The Scott-Tee is a well-known device for transforming from two-phase input to three-phase output, or conversely, as shown, from a three-phase input to a two phase output. When the conversion is from three-phase to two phase, the two phase output are respectively signals which are proportional to the sine and cosine of the input signal. Scott-Tee transformers are well-known devices for achieving such transformations and reference is hereby made to the textbook "Alternating Current Machinery" — LV Bewley, MacMillan Co., N.Y. 1949, and particularly pages 89 through 91 thereof which describe the basic characteristics of the so-called Scott-Tee connection. The output from Scott-Tee 90 is a pair of signals proportional to the sine and cosine of the shaft angle $\theta$, i.e., $E_1 = E_M \sin wt \cos \theta$ $E_2 = E_M \sin wt \sin \theta$ where
$E_M$ = the peak voltage
$\theta$ = shaft angle
$E_M \sin wt$ = the excitation voltage for the gyro position transmitter 35

The sinusoidal and cosinusoidal signals must be demodulated to remove the carrier and produce DC signals which vary with the sine and cosine of the shaft angle. The signals from Scott-Tee 90 are therefore applied to a pair of demodulators 93 and 94 which are respectively coupled to a common reference signal source 95.

The demodulators are preferably synchronous demodulators since the signals from the gyro pickoff and control differential transformers are typically single side band, suppressed carrier signals so that the carrier must be reinserted for demodulation purposes.

The demodulated signals, which are proportional to the sine and cosine of a shaft angle, are converted to angular rate signals $R_1$ and $R_2$ by differentiating the signals in the differentiating networks 96 and 97 which are coupled respectively to the outputs of demodulators 93 and 94. Differentiating networks are well-known circuits for producing an output which is the first derivative of an input signal and networks 96 and 97 may take various forms including that of a simple R-C circuit. The differentiated signals are applied to low pass filters 98 and 99 which have a cutoff frequency such that high frequency components are blocked and only low frequency components are passed. The low pass filters are provided in order to avoid actuating of slaving and erection cutoff in response to normal yaw oscillations of the craft since oscillations about yaw axis will not result in the buildup of the acceleration induced errors in the directional and vertical gyros that occur during turns. Hence, some provision must be made to prevent these high frequency components typical of yaw oscillation from affecting the turn rate cutoff signal generating channel. Low pass filters 98 and 99 attenuate the high frequency signal components due to yaw oscillations while passing lower frequency signals representative of shaft rotation due to turning of the craft.

The differentiated and filtered signals are applied to a vector summing network 100 in which they are vectorially combined to produce an output signal proportional to shaft angle rate of change. The vectorial summing of these two signals produces an output signal which is directly proportional to the total rate signal, i.e., $$R = E_M \frac{d\theta}{dt}.$$

Since this signal is proportional to the rate of change of the angular position of the shaft, the voltage at the output of the summing vector network may be utilized to initiate turn rate cutoff whenever the angular rate of change during the turn exceeds a predetermined value. To this end, the rate signal from vector summing network 100 is applied as one input to comparator 10, the other input of which is a reference signal representing a predetermined turn rate such as 3° per minute. If the input voltage to the comparator from the vector summer exceeds the reference voltage, indicating that the turn rate exceeds 3° per minute, for example, the comparator, which may be of any suitable construction, puts out a control signal which is then applied to network 8 to initiate cutoff of slaving and roll erection.

The vector summing network may be of any suitable configuration either electromechanical or purely electronic. Many devices for vector summing of either two or three variables are available. As pointed out previously, resolver and resolver chains are examples of electromechanical devices which may be utilized for vector summing. Alternatively, logic circuits which compute the square root of sum of two or three squares may also be utilized.

The system illustrated in FIG. 3, as has been pointed out previously, operated in a normal slaving and roll erection mode as long as the angular turn rate is less than a predetermined rate such as 3°/min. for example. Thus, in normal operation, any deviation between the heading of the aircraft as indicated by directional gyro 1, and as indicated by magnetic compass 2 will result in an output signal from control transformer 32 which is coupled to gyro torque motor 56 to precess the gyro and bring it back into alignment with the magnetic compass. Similarly, any deviation of the vertical gyro spin axis from the Earth's gravity vector results in an output signal from the gravity sensing, pendulous device 6. This signal is amplified and applied to torque motor 73 which precesses the gyro to align the spin axis vertically. Simultaneously, the output from the directional gyro is fed through control differential transformer 37 to turn rate cutoff signal generating signal channel 9 where the heading information is processed to produce a signal proportional to the rate of shaft rotation, if any, and hence, to the rate of turn of the craft. In the absence of the output from the turn rate cutoff signal channel, or if it is below a predetermined amplitude, slaving relay winding 61 associated with slaving channel interrupt network 4 is energized and the armatures 59 and 60 associated therewith are positioned against the normally open contacts 58 thereby applying the output from amplifier 54 to torque motor 56 and slaving the directional gyro to the magnetic compass. Similarly, relay winding 80 associated with roll erection interrupt channel 8 is in the deenergized state so that armature 79 is positioned against the normally closed contact 77 thereby connecting lead 76 from roll erection amplifier 74 to the torque motor 73 thereby precessing the vertical gyro in response to the output from the gravity sensing pendulous device 6 mounted on the outer gimbal. Whenever the angular rate of rotation of directional gyro transmitter output exceeds a predetermined rate such as 3° per minute indicating that the rate of turn also exceeds 3°/min. a control signal from comparator 10 is generated which energizes relay winding 80. When relay winding 80 is energized relay armature 79 is moved from the normally closed contact 77, interrupting the connection between amplifier 74 to torque motor 73 thereby terminating roll erection of the vertical gyro in response to output signal from the vertical gravity sensing element 6.

Simultaneously, armature 84 controlled by relay winding 80 is also actuated and moves away from the normally closed contact 82 against the normally open contact 83. The positive supply voltage from mode control switch 86 is disconnected from slaving relay winding 61 deenergizing the winding. When relay winding 61 is deenergized armatures 59 and 60 in slaving interrupt network 4 move from the normally open contacts 58 to normally closed contacts 57 thereby disconnecting the output of amplifier 54 from torque motor 56 so that directional gyro 1 operates in the free gyro mode and is no longer slaved to the output of magnetic compass 2.

The servo network which is controlled by control differential transformer 37 and repeating control transformer 44 continues to operate to align the system heading output shaft 34 so that it follows the directional gyro during the turn. Thus, although slaving and roll erection is interrupted the heading shaft servo system continues to follow the position of the directional gyro in the turn even though the follow-up rates necessary during the turn may result in very high angular turn rates up to 300° per second. At the end of a high speed turn the system heading output shaft has closely tracked the turn of the aircraft without introducing acceleration induced dynamic errors in magnetic heading and roll.

In the system illustrated in FIG. 3, the shaft angle position information is converted into sine and cosine functions for further processing in the turn rate cutoff signal generating channel by means of a Scott-Tee transformer which converts a three-phase signal from the differential transformer and into the desired sine and cosine functions. In FIG. 4, a different arrangement including an electromechanical device is utilized to provide the sine and cosine functions for processing in the turn rate cutoff signal generating channel. Thus, in FIG. 4, the signals representative of the directional gyro shaft angle from the directional gyro pickoff, not shown are impressed on input terminals 101 of transolver 102. Transolver 102 includes a polyphase stator winding 103 and a pair of quadrature rotor windings 104 and 105. The outputs from the rotor windings are respectively proportional to the sine and cosine of the sum of the gyro heading angle and the angular position of shaft 106 on which the rotor windings are mounted and represent the system heading shaft angle. The signals proportional to the sine and cosine of the shaft angle are applied to output terminals 108 which are coupled to turn rate cutoff signal generating channel, not shown, where the signals are demodulated, differentiated, and then combined vectorially to produce a control signal which is proportional to the rate of change of shaft angle rotation.

The signals proportional to the sine and cosine of the shaft angle are also applied over the leads 109 and 110 to a resolver 111 which controls the servoloop for positioning the system heading shaft 34. Resolver 111 has the signals proportional to the sine and cosine applied respectively to the quadrature stator windings 112 and 113 to produce a voltage in rotor winding 114 which is equal to the vectorial sum of the two input signals. A voltage is induced in rotor winding 114, only if there is a difference between the angular output of transolver 102 and the system heading shaft. This signal is applied through a summing node 115 to the input of servo amplifier 116. The amplified signal from servo amplifier 116 drives a servo motor 117 through reduction gearing 118 to position the output shaft so that it corresponds to the gyro heading. This also repositions rotor 119 of control transformer 120 coupled to magnetic compass 2. If the magnetic heading signal coupled to stator windings 121 does not correspond to the angular position of rotor winding 119 and system heading shaft 34, a voltage is induced in winding 119 which is proportional to this angular difference. This voltage is applied over the output terminals 122 to the slaving channel of the heading attitude and reference system. The slaving channel, not shown, drives the torque motor associated with one of the gimbals of the directional gyro to precess the gyro in such a manner and by such an amount to bring it into correspondence with the orientation of the magnetic compass.

Servo motor 117 also drives generator 123 to provide a negative feedback signal for the servoloop which is applied over lead 124 to summing node 115 and amplifier 116 to provide rapid response of the servo system. Reduction gearing 118 induces the rotational speed from that of servo motor 117 which normally turns at a much faster rate of speed than the rate at which the craft is turning. Hence, servo motor 117 must be geared down to drive the system's heading shaft at the same rate as the directional gyro output shaft.

It will be apparent from the description of FIG. 4 that mechanization illustrated in FIG. 4, i.e., the use of transolver to convert the shaft angle θ into the sine and cosine functions of the shaft angle, performs the same function as the Scott-Tee arrangement utilized in FIG. 3. Depending upon the application and environment involved, one or the other may be preferred. It is to be understood, however, that these are merely alternative ways of providing the sine and cosine functions which are then processed electrically to produce a signal proportional to the rate of shaft rotation and hence, to the rate of turn of the aircraft.

In the heading, attitude, reference systems illustrated in FIG. 3 and 4, the signals proportional to the sine and cosine of the shaft angle θ are taken from the directional gyro position transmitter. Hence, at the turn rate for which cutoff is desired, i.e., 3° per minute, for example, the shaft is rotating relatively slowly and the change in the cosine and sine components of the shaft angle also vary at a relatively slow rate. In certain circumstances, it may be desirable to drive the resolver or other electromechanical device which produces a sine and cosine components of directional gyro shaft angle at a rate which is greater than the rate of rotation of the gyro shaft but which is still proportional thereto. The gearing between the servo motor and the heading shaft provides a means for driving a resolver at a rate greater than the rate of heading and gyro shaft rotation, while at the same time, maintaining the desired relationship. In this fashion, a much faster rotational rate signal may be obtained from the turn rate cutoff signal generating channel, while at the same time, accurately reflecting the rate of turn of the craft.

FIG. 5 illustrates an arrangement wherein the resolver which is utilized to produce the sine and cosine functions of the shaft angle is driven through the reduction gearing associated with the servo motor at a speed which is intermediate between speed of the motor and the speed of the system heading shaft. In this fashion, the signal level will be enhanced, while at the same time, maintaining the desired relationship and proportionality between the resolver output signals and the rate of turn of the gyro and the turn rate of the craft. Thus, in FIG. 5, the gyro heading input from the directional gyroscope, not shown, is applied to the input terminals 125 of a control differential transformer 126. The gyro heading input is applied to the polyphase stator windings 127 of the differential transformer and produces a signal in polyphase rotor winding 128 which represents the sum of the gyro heading input and the preset angular position of the rotor winding established by the rotor shaft 129 and the setting knob 130. The output from control differential transformer 126 is applied as an input to a repeating control transformer 131 to produce an output signal which is proportional to the angular displacement of the directional gyro. Control transformer 131 has a polyphase stator winding 132 which is connected to the rotor winding of the control differential transformer. A rotor winding 133 has a voltage induced therein which is proportional to the sine of the difference between the input angle and the mechanical angle of the rotor 133. That is, if the shaft angle of the directional gyro as represented by the output signal from the control differential transformer is properly oriented with the position of heading output shaft 34 on which rotor 133 is mounted, no voltage is induced in the rotor winding. However, if there is an angular difference, a voltage is induced in rotor 133 which is applied to a servoloop which drives system heading shaft 34 into correspondence with the directional gyro and simultaneously repositions rotor winding 134 of control transformer 135 coupled to the output of magnetic compass 2. The output of rotor winding 134 is coupled in the usual manner, to the directional gyro slaving circuit, not shown, to control the torque motor associated with the directional gyro to precess the gyro and align it with the magnetic compass.

The servo network is controlled from rotor winding 133 of repeating control transformer 131 to drive heading shaft 34 into angular alignment with the directional gyro. The signal from the rotor 133 is applied to a summing mode 136 which feeds a servo amplifier 137. The output from servo amplifier 136 is applied to a reversible servo motor 138 which drives the heading shaft 34 through a multi-stage reduction gearing shown generally at 139. A feedback generator 140 is mounted on high speed shaft 141 and provides a negative feedback signal to summing mode 136 and servo amplifier.

Servo motor 138 and high speed shaft 141 drive a first reduction gearing stage 142 which is coupled through an intermediate speed shaft 143 to a second gear reduction stage 144 which drives system heading shaft 34. It can be seen that the gear reduction ratio provided must be such as to drive the output heading shaft at an angular rate which corresponds with the rate of rotation of the directional gyro and hence, the turn rate of the aircraft.

Mounted on the intermediate speed shaft 143 is a resolver 146 which is utilized to provide the sine and cosine functions of the angular shaft position. By virtue of the higher rate of rotation of the intermediate shaft, the resolver is driven at a higher speed and provides an increased rotation rate signal for the turn rate cutoff signal channel. Thus, rotor winding 143 of the resolver is mounted on intermediate speed shaft 143 and is excited from a suitable source of alternating voltage applied to the rotor input terminal 145. A pair of quadrature stator windings 147 and 148 have voltages induced therein which are respectively proportional to the product of the rotor voltage and the cosine and sine of the rotor shaft angle.

The two sine and cosine signals from resolver 145 are processed in the turn rate cutoff signal generating channel described earlier in connection with FIG. 3 to demodulate, differentiate and vector sum the two signals to produce a rate signal proportional to shaft angle rotation which is utilized to initiate slaving and roll erection cutoff if the turn rate exceeds the predetermined rate.

It will be seen that by driving the resolving element which produces sinusoidal and cosinusoidal signals at a much higher rate than the actual shaft rotation, while at the same time, maintaining it proportional thereto, that a much higher signal level for the turn rate cutoff signal generating circuit may be achieved.

In the system illustrated in FIGS. 3, 4 and 5, the rate signals were derived by processing signals representing the sine and cosine functions of the shaft angle. The signals representative of the sine and cosine of the shaft angle were produced by taking the actual shaft position signal and converting them to the sine and cosine functions of the shaft angle by means of resolvers, Scott-Tee transformers, or by driving potentiometers which produce the desired DC sinusoidal and cosinusoidal signals. It is also possible, however, to obtain the sinusoidal and cosinusoidal signals and to produce a rate signal for turn rate cutoff purposes directly from the phase displaced output signals by a three wire synchro, or control transmitter without using resolvers or Scott-Tees, etc. The manner in which this may be done, can be understood by considering the following. The outputs of a control transmitter or three wire synchro are three phase displaced sinusoidal voltages which may be defined as follows:

$$E_{13} = E_M \sin \theta \tag{10}$$

$$E_{32} = E_M \sin (\theta + 120°) \tag{11}$$

$$E_{21} = E_M \sin (\theta + 240°) \tag{12}$$

where $\theta$ represents the shaft angle and the double subscripts 13, 32, 21 represent the output of the polyphase windings by lead to lead number. The three signals from the synchro can be converted to rate signals representing the rate of change of shaft angle, $R_{13}$, $R_{32}$ and $R_{21}$ by differentiation. The first derivative of the synchro output signals may, therefore, be represented by the following:

$$R_{13} = \frac{d(E_{13})}{dt} = E_M \cos \theta \, \frac{d\theta}{dt} \tag{13}$$

$$R_{32} = \frac{d(E_{32})}{dt} = E_M \cos (0 + 120°) \, \frac{d\theta}{dt} \tag{14}$$

$$= E_M \left(-1/2 \cos \theta - \sqrt{\frac{3}{2}} \sin \theta \right) \frac{d\theta}{dt}$$

$$R_{21} = \frac{d(E_{21})}{dt} = E_M \cos (\theta + 240°) \, \frac{d\theta}{dt} \tag{15}$$

$$= E_M \left(-1/2 \cos \theta + \sqrt{\frac{3}{2}} \sin \theta \right) \frac{d\theta}{dt}$$

It will be noted from Equations 13-15 that differentiation of the phase displaced sinusoidal signals, result in rate signal $R_{131}$ etc. which include both the sinusoidal and cosinusoidal functions of the shaft angle $\theta$. If the three rate signals are then vector summed to produce a total rate signal R, the rate signal R is defined as:

$$R = [R_{13}^2 + R_{32}^2 + R_{21}^2]^{1/2} \tag{16}$$

$$R_{13}^2 = E_M^2 \cos^2 \theta \left(\frac{d\theta}{dt}\right)^2 \tag{17}$$

$$R_{32}^2 = E_M^2 \left(1/4 \cos^2 \theta + \sqrt{\frac{3}{2}} \cos \theta \sin \theta + 3/4 \sin^2 \theta \right) \left(\frac{d\theta}{dt}\right)^2 \tag{18}$$

$$R_{21}^2 = E_M^2 \left(1/4 \cos^2 \theta - \sqrt{\frac{3}{2}} \cos \theta \sin \theta + 3/4 \sin^2 \theta \right) \left(\frac{d\theta}{dt}\right)^2 \tag{19}$$

$$R = \left[ E_M^2 \left( \frac{d\theta}{dt} \right) (\cos^2 \theta + 1/2 \cos^2 \theta + 3/2 \sin^2 \theta) \right]^{1/2} \quad (20)$$

$$R = \left[ 3/2\, E_M^2 \left( \frac{d\theta}{dt} \right)^2 (\cos^2 \theta + \sin^2 \theta) \right]^{1/2} \quad (21)$$

$$R = \sqrt{\frac{3}{2}} E_M \frac{d\theta}{dt} \quad (22)$$

Thus, it can be seen that the total rate signal R obtained by processing the phase displaced output signals from the synchro are also directly proportional to the rate of shaft rotation, except for the fact that the proportionality constant differs somewhat between the various approaches.

In actuality, it is also found that where a three wire synchro or control transmitter signal is processed directly, only two of the three signals have to be differentiated inasmuch as the 120° phase relationship among the three signals causes any one to be the negative of the sum of the other two. Furthermore, polarity correction is not required because polarity becomes arbitrary in the vector summing squaring process. This, if two of the output signals of a synchro are differentiated, the two differentiated signals are summed to produce a third signal, and the three signals (including the third signal which is the summation product of the first two) are vector summed, the output signal is proportional to the rate of shaft rotation.

Figure 6:
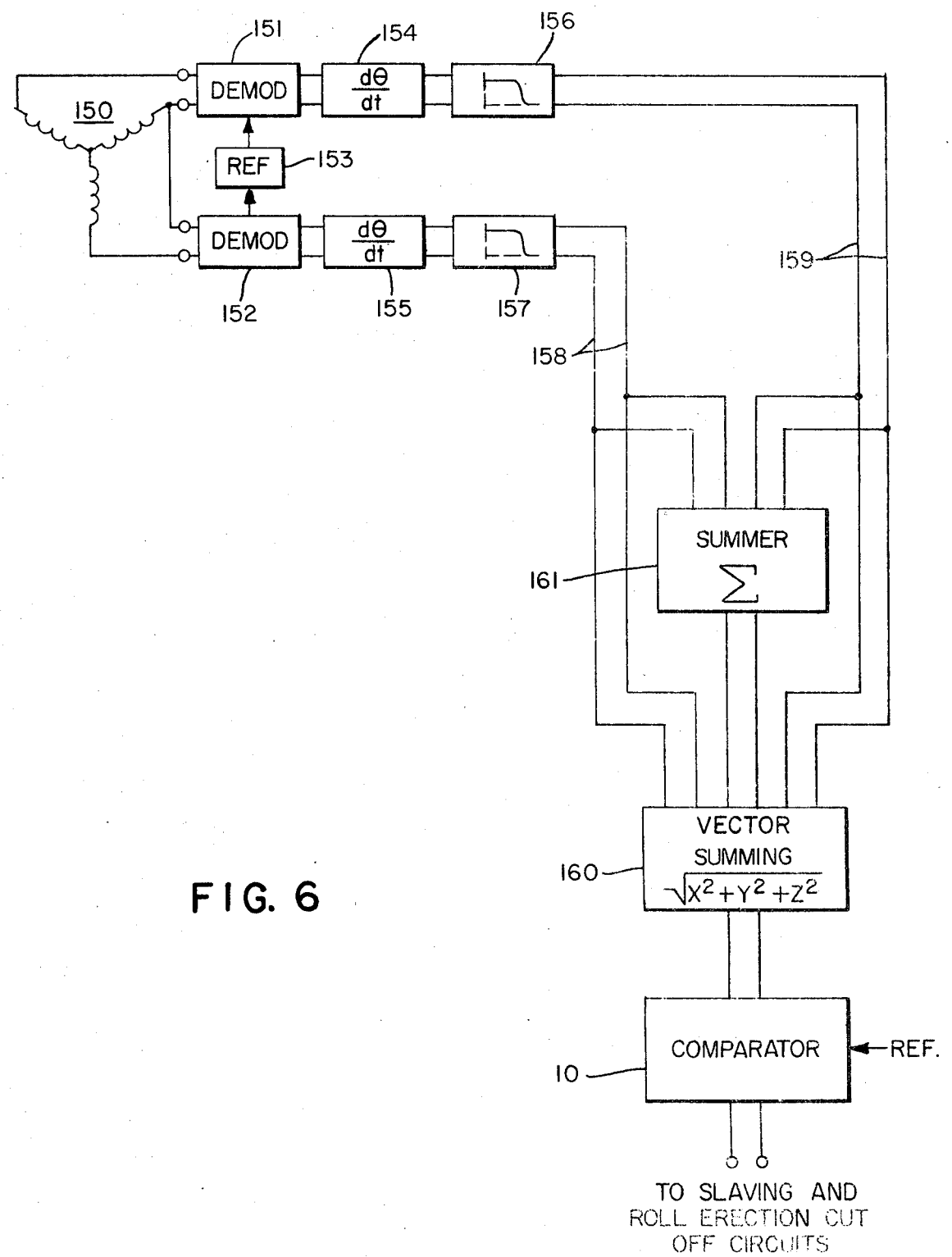
FIG. 6 is yet another embodiment of a portion of a system for producing signals representative of the shaft angle.

FIG. 6 illustrates a circuit for producing a rate signal from the phase displaced outputs of a three wire circuit by differentiating two of the three output signals, combining the differentiated signals to generate a third signal and vector summing the differentiated signal and the combined signal to produce an output signal proportional to the rate of shaft rotation. Thus, the heading signal from the gyro position transmitter is received in a polyphase stator windings 150 in response to angular movement of rotor, not shown, which is positioned in accordance with the gyro shaft angle. Two of the output signals are applied to synchronous demodulators 151 and 152 along with a signal from reference source 153 to demodulate the single side band, carrier suppressed signals to produce varying DC voltages which vary with the sine of the shaft angle $\theta$ but are displaced in phase by 120°. The demodulated signals are differentiated in differentiating circuits 154 and 155 which may be of any well-known configuration to produce output rate signals which are filtered in a pair of low pass filters 156 and 157 to remove any high frequency components due to yaw oscillations. THe filtered signals are coupled over leads 158 and 159 to a vector summing network 160 and also to the inputs to a summing, by adding, network 161 to produce a third output signal, which, as pointed out above, is equal to the negative of the sum of the other two signals.

The third signal from summing network 161 is also applied to vector summing network 160 to produce an output total rate signal which is representative of the rate of change of the shaft angle and hence, of the turn rate of the aircraft carrying the heading attitude and reference system. The rate signal from vector summing network 160 is applied to a comparator 10 where it is compared to a reference signal to produce an output or control signal whenever the rate signal, and hence, the turn rate of the aircraft exceeds a predetermined rate such as 3° per minute. The control signal as pointed out previously, is then applied to the slaving and roll erection cutoff circuits to interrupt slaving of the directional gyro to the magnetic compass and to interrupt the roll erection in response to the pendulous gravity sensing device.

In the various arrangements shown and described previously, the signals proportional to the sine and cosine of shaft angle have been signals from synchros and the like and have to be demodulated to generate the DC signals representing the sine and the cosine of the shaft angle. It will be appreciated by those skilled in the art, that it is also possible to obtain the full benefits of the instant invention by providing the DC signals representing the sine and cosine of the shaft angle directly by utilizing potentiometers driven from the gyro heading shaft thereby eliminating the need for demodulation of the signals.

It will be apparent from the description of the various arrangements shown and described that a heading and attitude reference system has been described which includes a turn rate cutoff channel for interrupting slaving of the directional gyro to the magnetic compass and roll erection of the vertical gyro whenever the turn rate of the aircraft on which the system is mounted exceeds a predetermined rate. In this fashion, dynamic errors introduced by turns are eliminated, while at the same time, providing a system which has extremely rapid response and is capable of following extremely rapid rates of turn. The servo system for the output heading shaft is therefore highly sensitive and capable of high slewing rates of which may reach angular rates as high as 300° per second. Furthermore, the turn rate cutoff signal generating arrangement is one which eliminates the need for electromechanical devices such as tachometer rate generators which lack sensitivity at very low angular turn rates, or for rate gyros which are large, bulky, and expensive. This highly desirable result is achieved of the sine and cosine of the shaft angle of the gyro and through signal processing techniques such as differentiation and vector summing to produce a signal which is proportional to the total rate of shaft rotation and hence, of the rate of turn of the aircraft. Furthermore, by virtue of the fact that the turn rate cutoff signal generating circuit contains only passive components, solid state, integrated circuit components may be utilized thereby offering further advantages in terms of reduced size and compactness as compared to electromechanical devices such as tachometers, generators and such. Hence, a turn rate cutoff system for heading attitude and reference system has been provided which is small in size, is highly accurate and has good response time to permit cutoff at low rates of turn, while at the same time, permitting rapid and accurate response of the heading output shaft for very rapid rates of turn.

While a number of specific embodiments of this invention have been shown, and described above, it will, of course, be understood that the invention is not limited thereto since many modifications both in the circuit arrangement and in the instrumentalities employed therein may be made. It is contemplated by the appended claims to cover any such modifications which fall within the true spirit and scope of this invention.

What is claimed as new and desired to be secured by Letters Patent of the United States is:

1. A heading, attitude reference system for a movable craft comprising;
   a. an inertial, directional reference means which has a stable orientation in space,
   b. a rotatable output heading shaft,
   c. a servoloop responsive to the relative orientation in azimuth between the craft and said directional reference means for driving said heading shaft in response to turning of the craft,
   d. slaving control means for correcting the orientation of said directional reference means upon departure of said directional reference means from a predetermined orientation in azimuth,
   e. an inertial, vertical reference means which has a stable orientation in space,
   f. slaving control means for correcting the orientation of said vertical reference means upon departure of said vertical reference means from a true vertical orientation,
   g. signal processing means for receiving signals from said directional reference means which are representative of the angular heading information, said processing means including means for converting the signals representative of the angular information into signals proportional to the sine and cosine of the heading angle, means for differentiating the signals proportional to the sine and cosine of the heading angle, means for squaring the differentiated sine and cosine signals, and vector summing means for extracting the square root of the sum of the squared differentiated sine and cosine signals for producing a signal proportional to the angular rate of change which is proportional to the rate at which the craft is turning and
   h. means responsive to said angular rate of change signal for interrupting the operation of both of said slaving control means when the craft rate of turn exceeds a predetermined level.

2. The heading, attitude reference system according to claim 1 wherein said converter means for producing signals proportional to the sine and cosine of said angle is a Scott-Tee transformer.

3. The heading, attitude reference system according to claim 1 wherein the sine/cosine converter means includes angular resolving means having a rotor coupled to said output shaft and stator windings producing signals proportional to the sine and cosine of an angle.

4. The heading, attitude reference system according to claim 3 wherein the rotor of said angular resolving means is driven at a higher speed than said heading shaft but at a speed proportional to the heading shaft speed.

5. The heading, attitude reference system according to claim 1 wherein said angular position signal from said inertial directional reference means is a three phase signal and wherein said signal processing means includes means for differentiating two of the said three phase signals, algebraic summing means for algebraically summing the two differentiated signals to produce a summation signal, and means for vectorially summing the two differentiated signals and said summation signal to produce an angular rate signal.

6. The heading attitude and reference signal according to claim 5 wherein the differentiated signals and the summation signal are individually squared and the square root of the sum of the squared signals is extracted to produce said rate signal.

7. A heading reference system for a movable craft comprising:
   a. an inertial, directional reference means which has a stable orientation in space,
   b. a rotatable output heading shaft,
   c. a servoloop responsive to the relative orientation in azimuth between the craft and said directional reference means for driving said heading shaft in response to turning of the craft,
   d. slaving control means for correcting the orientation of said directional reference means upon departure of said directional reference means from a predetermind orientation in azimuth,
   e. signal processing means for receiving signals from said directional reference means which are representative of angular heading including means for converting said angular signals to signals proportional to the sine and cosine of the heading angle, means for differentiating the signals proportional to the sine and cosine of the heading angle, means for squaring the differentiated signals, and vector summing means for extracting the square root of the sum of the squared differentiated signals for producing an angular rate signal which is proportional to the rate at which the craft is turning,
   f. means responsive to said angular rate of change signal for interrupting the operation of said slaving control means when the craft rate of turn exceeds a pedetermined level.

8. An attitude reference system for a movable craft comprising:
   a. an inertial, directional reference means which has a stable orientation in space,
   b. a rotatable output heading shaft,
   c. a servoloop responsive to the relative orientation in azimuth between the craft and said directional reference means for driving said heading shaft in response to the turn of the craft,
   d. an inertial reference means which has a stable orientation in space,
   e. slaving control means for correcting the orientation of said vertical reference means upon departure of said vertical reference means from a true vertical orientation,
   f. signal processing means for receiving signals from said directional reference means which are representative of angular heading, including means for converting said angular signals to signals proportional to the sine and cosine of the heading angle, means for differentiating the signals proportional to the sine and cosine of the heading angle, means for squaring the said differentiated signals, and vector summing means for extracting the square root of the sum of the squared, differentiated signals for producing an angular rate signal which varies with the craft rate of turn, and,
   g. means responsive to said angular rate of change signal for interrupting the operation of said slaving control means for said vertical reference means when the craft rate of turn exceeds a predetermined level.

9. The attitude, reference system according to claim 8 wherein said signal processing means includes means for converting the angular shaft position signal to sine and cosine functions of said angle, and means for differentiating said sine and cosine signals, and means to produce an angular rate signal from said differentiated sine and cosine signals.

* * * * *